United States Patent [19]

Ogawa et al.

[11] Patent Number: 4,948,657

[45] Date of Patent: Aug. 14, 1990

[54] MULTI-LAYER SHRINK FILM

[75] Inventors: Tadatoshi Ogawa; Teruaki Yoshida, both of Ichihara, Japan

[73] Assignee: Sumitomo Chemical Company, Limited, Osaka, Japan

[21] Appl. No.: 162,291

[22] Filed: Feb. 25, 1988

[30] Foreign Application Priority Data

Mar. 9, 1987 [JP] Japan .................................. 62-53516

[51] Int. Cl.$^5$ .......................... B32B 27/00; C09J 7/02
[52] U.S. Cl. .................................... 428/218; 428/516; 428/910
[58] Field of Search .......................... 428/516, 218, 910

[56] References Cited

U.S. PATENT DOCUMENTS

| 4,551,380 | 5/1985 | Schoemberg | 428/518 |
| 4,720,427 | 1/1988 | Clauson et al. | 428/516 |
| 4,786,562 | 11/1988 | Kakugo et al. | 428/516 |

FOREIGN PATENT DOCUMENTS

| 11618 | 8/1983 | Australia . |
| 58937 | 1/1987 | Australia . |
| 0053925 | 6/1982 | European Pat. Off. . |
| 0202812 | 11/1986 | European Pat. Off. . |
| 0247896 | 12/1987 | European Pat. Off. . |
| 3720743 | 1/1988 | Fed. Rep. of Germany . |
| 2115348 | 9/1983 | United Kingdom . |

Primary Examiner—P. C. Ives
Attorney, Agent, or Firm—Stevens, Davis, Miller & Mosher

[57] ABSTRACT

A multi-layer shrink film obtained by forming an assembly which comprises an interlayer comprising a flexible propylene resin having a Vicat softening point of 115° C. or less and/or a linear very low-density polyethylene having a density less than 0.91 g/cm$^3$ sandwiched between outermost layers comprising a propylene resin having a Vicat softening point higher than that of the flexible propylene resin of interlayer and within the range of 80°–150° C. followed by stretching said assembly is disclosed. The film obtained according to the present invention is well suited for a multi-layer shring packaging film and the like.

3 Claims, No Drawings

MULTI-LAYER SHRINK FILM

The present invention relates to a multi-layer shrink packaging film which is flexible and also is superior in various properties such as low-temperature shrinkability, transparency, gloss and blocking resistance and preferably in tear resistance.

At present, polypropylene, polyvinyl chloride, polyethylene and the like are known as materials for shrink packaging films, but these have respective merits and demerits and none of them meet all requirements.

Polyvinyl chloride is superior in transparency and much superior in low-temperature shrinkability, but it suffers from the problems such as inferior low-temperature resistance and tear resistance and generation of corrosive gas at melt cutting and heat sealing.

As to polyethylene, films prepared by biaxial orientation of linear low-density polyethylene are recently sold, but they have problems in transparency and low-temperature shrinkability, although excellent in low-temperature resistance and strength of sealed portion.

As to polypropylene, there are known such films as prepared by biaxial orientation of propylene-ethylene random copolymer having a ethylene content of about 3-5 wt % or propylene-ethylene-butene-1 random terpolymer having a ethylene content of about 1-3 and butene-1 content of about 3-10 wt %, but they have problems in low-temperature shrinkability and tear resistance, although superior in transparency and gloss.

Moreover, among the propylene copolymers, there is known a film made from a propylene-butene-1 copolymer having a relatively large bound butene-1 content [see Japanese patent application Kokai (Laid-Open) No. 53-113692]. Although the film may have a low-temperature shrinkability comparable to that of polyvinyl chloride film, it is inferior in blocking resistance and tear resistance.

In addition to the above-mentioned single-layer films, multi-layer shrink films comprising a core layer of a linear polyethylene resin sandwiched between the surface layers of propylene-ethylene copolymer has been known. [see Japanese patent application Kokai (Laid-Open) No. 58-166049]. According to the inventors' knowledge, such multi-layer shrink films have the advantages of both linear polyethylene resin and propylene-ethylene copolymer, excellent transparency and gloss and a tear resistance improved to some extent, but they still have problems in low-temperature shrinkability.

The object of the present invention is to provide a shrink packaging film which is superior in properties such as transparency, gloss, blocking resistance, low-temperature resistance and strength of sealed portion, and preferably also in tear resistance and further, much superior in low temperature shrinkability.

The inventors have found that a shrink packaging film which posses all of the above properties can be obtained by using as an interlayer a specific flexible propylene resin having a low Vicat softening point or a linear very-low-density polyethylene or both of them in the form of a multi-layer and as both outermost layers a specific propylene resin. The present invention is based on this finding.

That is, according to the present invention, there is provided a multi-layer shrink film obtained by forming an assembly which comprises an interlayer comprising a flexible propylene resin having a Vicat softening point of 115° C. or lower and/or a linear very-low-density polyethylene having a density of 0.91 g/cm$^3$ or less sandwiched between outermost layers comprising a propylene resin having a Vicat softening point higher than that of the flexible propylene resin of interlayer, in case the interlayer comprises propylene resin, and within the range of 80°-150° C. followed by stretching said assembly.

The multilayer shrink film of the present invention is characterized in that in spite of its low-temperature shrinkability comparable to that of polyvinyl chloride shrink films, it still is superior in blocking resistance and also in properties such as transparency, gloss, low-temperature resistance and strength of sealed portion and preferably also in tear resistance and furthermore, hardly wrinkles in the corner portions at the time of shrink packaging, is good in finish and causes no generation of corrosive gas at melt cutting and heat sealing.

The propylene resins used as the outermost layers of the multi-layer shrink film of the present invention may be known ones. As examples thereof, mention may be made of copolymers of propylene and ethylene; copolymers of propylene and butene-1; terpolymers of propylene, ethylene and butene-1. Among them, preferred are the latter two, since they have good effect on low-temperature stretchability of resulting multi-layer shrink films.

Vicat softening point of the propylene resin used in the present invention is normally 80°-150° C., preferably 85°-140° C., more preferably 85°-130° C. and most preferably 90°-125° C.

The use of a propylene resin having a Vicat softening point higher than 150° C. is not preferred, since the stretching at a low temperature becomes difficult or the resulting film loses its transparency. By contrast, the use of a propylene resin having a Vicat softening point lower than 80° C. is not preferred either, since the blocking resistance or slippage of the resulting film becomes inferior.

Melt index (MI; measured at 230° C.) of the propylene resin is normally 0.5-20 g/10 min, preferably 1.0-10 g/10 min.

To this propylene resin may be added a propylene based copolymer (e.g., a polypropylene homopolymer) having a Vicat softening point of 150° C. or higher. In this case, Vicat softening point of the resulting composition is preferably within the range as specified above. Further, other polymers may be added in a small amount to the propylene resin.

The addition of 20% by weight or more of the specific propylene-α-olefin copolymer specified below to the propylene resin is more preferred, because the assembly comprising such a propylene resin hardly loses the transparency thereof even when it is stretched at a low temperature and it has good stretching processability.

The specific examples of the propylene-α-olefin copolymer are copolymers of propylene and an α-olefin having 4 or more carbon atoms or copolymers of propylene, an α-olefin having 4 or more carbon atoms and ethylene and they usually satisfy the following conditions: (1) Content of the α-olefin having 4 or more carbon atoms is 8-35 mole %; (2) Ethylene content is 5 mol % or less; and (3) The cold xylene soluble portion is 15-70 wt %.

As the α-olefin having 4 or more carbon atoms, there may be used, for example, butene-1, pentene-1, hexene-1, 4-methyl-pentene-1 and the like alone or in combination, but it is preferred to use butene-1 as a main component because when, for example, vapor phase polymerization is employed, this is not readily liquefied and can be used in a high partial pressure.

Content of the α-olefin having 4 or more carbon atoms in the propylene-α-olefin copolymer is usually 8-35 mol %, preferably 10-30 mol %. When content of the α-olefin is less than 8 mol %, loss of transparency or breakage tends to occur at a low-temperature stretching operation while when more than 35 mol %, slippage or blocking resistance of stretched film is apt to deteriorate.

Ethylene content in the propylene-α-olefin copolymer is usually 5 mol % or less, preferably 3 mol % or less. When the ethylene content exceeds 5 mol %, there sometimes occurs reduction of transparency with a lapse of time or deterioration of blocking resistance of the film.

Cold xylene soluble portion (CXS) of the propylene-α-olefin copolymer is usually 15-70 wt %, preferably 16-60 wt %. When CXS is less than 15 wt %, loss of transparency or breakage tends to occur during stretching at low temperatures and when more than 70 wt %, slippage or blocking resistance of stretched film tends to be deteriorated.

The propylene-α-olefin copolymer can be prepared, for example, by solution polymerization method which is effected in a solvent or vapor phase polymerization method which is effected in vapor phase, using the so-called Ziegler-Natta catalysts (catalysts comprising a transition metal compound of groups IV-VIII of the periodic table, an organic compound of a typical metal of groups I-III of the periodic table and an electron donating compound or the like as a third component) which are known as a catalyst for stereospecific polymerization of α-olefins. For example, they may be obtained b the method disclosed in Japanese patent application No. 61-164505, namely, polymerization of copolymer (B).

When the propylene resin used in the present invention is a blend of a propylene resin with the specific propylene-α-olefin copolymers, the amount of the propylene-α-olefin copolymers is usually at least 20% by weight, preferably at least 30% by weight. When the amount is less than 20% by weight, loss of transparency or breakage of film sometimes occur at a stretching under low temperatures.

A flexible propylene resin and/or a linear very low-density polyethylene can be used as an interlayer of the multi-layer shrink film of the present invention.

The flexible propylene resin used in the present invention is the propylene resin for the outermost layers having a Vicat softening point of 115° C. or lower, preferably 110° C. or lower, more preferably 105° C. or lower. When the Vicat softening point is higher than 115° C., stretching at low temperatures becomes sometimes impossible o film sometimes loses transparency.

In addition, the Vicat softening point of the flexible propylene resin for the interlayer is lower than that of the propylene resin for the outermost layers. Otherwise, the advantage of employing the multi-layer film structure tends to be lost. Vicat softening point of the outermost propylene resin is higher than that of the resin for interlayer in order to impart films the properties such as heat resistance, blocking resistance, scratch resistance, etc.

One of preferred embodiments of the flexible propylene resin used as interlayer is such that it contains at least 20% by weight of the same propylene-α-olefin copolymer as specified for the propylene resin used for the outermost layers. This is because stretching of film at low temperatures becomes easier and the film does not tend to lose transparency at stretching.

Other preferred embodiments of the flexible propylene resin used as interlayer are resin compositions comprising a blend of hydrocarbon resins such as petroleum resin with propylene based copolymers. [see Japanese patent application Kokai (Laid-Open) Nos. 49-99645 and 49-99646 and Japanese patent application No. 61-260982].

The linear very low-density polyethylene used as interlayer of the multi-layer shrink film of the present invention is a copolymer of ethylene and one or more α-olefins having substantially no branched long chain and has a density less than 0.91 g/cm$^3$, preferably 0.850–0.907 g/cm$^3$, more preferably 0.850–0.905 g/cm$^3$. When the density is too high, film cannot be stretched at low temperatures, resulting in deterioration of shrinkability at low temperatures. Further, improvement in tear strength and low-temperature resistance is not so much. On the other hand, copolymers of too low densities are substantially difficult to obtain and are not desired.

As the α-olefins, mention may be made of, for example, propylene, butene-1, hexene-1, 4-methylpentene-1, octene-1 and decene-1. These may be used alone or in combination.

Method of polymerization includes, for example, solution polymerization and vapor phase polymerization under a low or medium pressure with transition metal catalysts and polymerization using transition metal catalysts under elevated temperature and pressure as for preparation of high pressure process polyethylene [see Japanese patent application Kokai (Laid-Open) No. 59-230011 and Reference Examples 5 and 6 of Japanese patent application No. 60-63048].

The conventionally known linear low-density polyethylene can be subjected to a film stretching alone, but linear very low-density polyethylene cannot be so probably because the density has been reduced to the possible lower limit. Thus, hitherto, it has been considered that linear very low-density polyethylene cannot be subjected to a stretching treatment required for obtaining a shrink film while the inventors have found surprisingly that linear very low-density polyethylene can also be subjected to a stretching treatment if it constitutes an interlayer of multi-layer film and a superior shrink film can be obtained therefrom.

The linear very low-density polyethylene may be such that having a crystallizability corresponding to the density, or may be rubbery copolymers having substantially no crystallizability.

The melt index thereof (MI; measured at 190° C.) is usually 0.1-20 g/10 min.

A linear low-density polyethylene (having a density of more than 0.91 to 0.93 g/cm$^3$) may be blended with the linear very low-density polyethylene. In this case, density of the resulting blend is preferably within the range as specified above. Furthermore, as far as the effects of the present invention are not severaly damaged, there may be added polymers such as, for example, high pressure process polyethylenes, ethylene-vinyl acetate copolymers, ionomers, ethylene-methyl methacrylate copolymers, ethylene-ethyl acrylate copolymers and ethylene acrylate copolymers.

Melt index of the resins used for the interlayer in the present invention is 0.1-20 g/10 min (measured at 230° C. for flexible propylene resin and at 190° C. for linear very low-density polyethylene).

One of the preferred embodiments of the multi-layer shrink film of the present invention includes a film comprising plural interlayers each comprising the above-specified flexible propylene resin or linear very low-density polyethylene. This film has the advantages that the inferior tear resistance of the multi-layer shrink films can be improved when the flexible propylene resin is used as interlayer, and the slow shrinkage rate, which obstructs high speed packaging, can be improved when the linear very low-density polyethylene is used as interlayer.

In the multi-layer shrink film of the present invention, the thickness ratio of the outermost layer to the total layer is preferably 0.05-0.35, and that of the interlayer to the total layer is preferably 0.30-0.90.

The multi-layer shrink film of the present invention may have other layers such as repro layer (a layer comprising reproduced resin) and the like in addition to the interlayer and the outermost layers which are essential components.

Resin compositions constituting the layers may contain additives such as, for example, antistatic agent, anti-blocking agent, slipping agent, anti-fogging agent, stabilizer and nucleating agent.

For obtaining the multi-layer shrink film of the present invention, firstly, there may be used known sheet forming methods such as, for example, T-die casting method using multi-layer die and water-cooling blown film method. Then, in order to stretching the obtained sheet, there may be employed known monoaxial stretching methods such as, for example, roll stretching and compression rolling and biaxial stretching methods such as tenter biaxial stretching method and tubular biaxial stretching method.

Stretching temperature is preferably as low as possible for increase of low-temperature shrinkability of resulting film, but stretching at low temperatures becomes difficult when Vicat softening point of the propylene resin of outermost layers is high. Suitable stretching temperature is usually from room temperature to 150° C.

Stretching ratio is preferably 2-10 times. In this case, stretching ratio in machine direction (MD) and that in transverse direction (TD) are not necessarily balanced and can be optionally chosen depending on use. Further, the film may be subjected to heat setting, if necessary.

Measurement of properties and evaluation thereof in Examples and Comparative Examples were made by the following methods.

(1) Haze: measured in accordance with ASTM-D1003

(2) Young's modulus: measured in accordance with ASTM-D882
Shape of film test specimen: Strip of 20×120 mm
Distance between chucks: 50 mm
Pulling rate: 5 mm/min (3) Tear strength (Elmendorf tear test): measured in accordance with ASTM-D1922

(4) Heat shrinkage:
Shrinkage of a film test piece of 5 cm square after dipping the same in a glycerine bath at a prescribed temperature for 10 seconds is measured as follows:

$$\text{Shrinkage (\%)} = \frac{\left(\begin{array}{c}\text{Size before}\\\text{heating}\end{array}\right) - \left(\begin{array}{c}\text{Size after}\\\text{heating}\end{array}\right)}{\text{(Size before heating)}} \times 100$$

(5) Vicat softening point: measured in accordance with ASTM-D1525 (with a load of 1 kg)

(6) Density: measured in accordance with ASTM-D1505 (Sample is prepared in accordance with JIS K6760).

(7) Cold xylene soluble portion (CXS):
5 g of polymer is dissolved in 500 ml of xylene and then gradually cooled to room temperature, then the mixture was left in a bath of 20° C. for 4 hours and was subjected to the filtration. The filtrate is concentrated, and completely dried and then weighed.

The following nonlimiting examples further explain the present invention.

Example 1

Sumitomo Noblen®FS6632 [Propylene-ethylene-butene-1 random terpolymer (ethylene content: 2.1 wt %, butene-1 content: 5.1 wt %) mfd. by Sumitomo Chemical Co., Ltd., MI: 5.9 g/10 min, Vicat softening point: 125° C.]was used as a resin for outermost layers and a linear very low-density polyethylene, Excellen®-VL, CN 2002 (ethylene-butene-1 copolymer mfd. by Sumitomo Chemical Co., Ltd., density: 0.899 g/cm$^3$, MI: 2.2 g/10 min) was used as a resin for interlayer.

The interlayer having a thickness of 300μ was sandwiched between the outermost layers each having a thickness of 100μ and the resulting assembly was pressed into a multi-layer sheet having a thickenss of 500μ. Therefrom was sampled a sheet of 90 mm square and it was subjected to a biaxial stretching under the following conditions to obtain a biaxially stretched film.
Stretching machine: Desk biaxial stretching machine manufactured by Toyo Seiki Co., Ltd.
Temperature: 90° C.
Preheating time: 3 minutes
Stretching ratio: 5 times for machine and transverse directions (simultaneous biaxial stretching)
Stretching speed: 5 m/min
The stretching was impossible at a stretching temperature lower than 90° C.

Properties of the thus obtained film having a thickness of about 20μ are shown in Table 1. This film was a good film which was flexible, superior in transparency, tear strength and low-temperature shrinkability and free from tackiness.

Example 2

A propylene-butene-1 copolymer (butene-1 content: 19.0 mol %, CXS: 23.1 wt %, MI: 4.5 g/10 min, Vicat softening point: 99° C.) was used as a resin for outermost layers and the same resin as used for interlayer in Example 1 was used as a resin for interlayer. Therefrom was prepared a multi-layer sheet of 500μ thick by pressing method in the same manner as in Example 1. From this multi-layer sheet was prepared a biaxially stretched film under the same conditions as in Example 1 except that the stretching was carried out at 70° C. The stretching was impossible at a temperature lower than 70° C.

Properties of the thus obtained film having a thickness of about 20μ are shown in Table 1. This film was a flexible film being superior in transparency and tear strength, extremely excellent in low-temperature shrinkability and free from tackiness.

Example 3

The same resin as used for outermost layers in Example 2 was used as a resin for outermost layers and a resin composition (MI: 2.1 g/10 min, density: 0.905 g/cm³) composed of 75% by weight of the linear very low-density polyethylene used in Example 1 and 25% by weight of a linear-low-density polyethylene, Sumikathene® L,FA201-0 (mfd. by Sumitomo Chemical Co., Ltd., MI: 1.8 g/10 min, density: 0.921 g/cm³) was used as a resin for interlayer. In the same manner as in Example 1, a multi-layer sheet having a thickness of 500μ was obtained by pressing method. From this multi-layer sheet was prepared a biaxially stretched film under the same conditions as in Example 1 except that the stretching was carried out at 70° C. The stretching of the sheet was impossible at a temperature lower than 70° C. Properties of the thus obtained film having a thickness of about 20μ are shown in Table 1. This film was as superior as that obtained in Example 2.

Example 4

The same resin as used for outermost layers in Example 2 was used as a resin for outermost layers and Tafmer®A-4085 (ethylene-butene-1 copolymer mfd. by Mitsui Petrochemical Industries, Ltd., MI: 3.6 g/10 min, density: 0.88 g/cm³) was used as a resin for interlayer. In the same manner as in Example 1, a multi-layer sheet having a thickness of 500μ was obtained by pressing method. From this sheet was prepared a biaxially stretched film under the same conditions as in Example 1 except that the stretching was carried out at 70° C. The stretching of the sheet was impossible at a temperature lower than 70° C. Properties of the thus obtained film having a thickness of about 20μ are shown in Table 1. This film was as superior as that obtained in Example 2.

Example 5

A resin composition (MI: 7.5 g/10 min, Vicat softening point: 112° C.) composed of 70 parts by weight of Sumitomo Noblen®WF816 (propylene-ethylene random copolymer mfd. by Sumitomo Chemical Co., Ltd., ethylene content: 4.8 wt %, MI: 9 0 g/10 min) and 30 parts by weight of the same propylene-butene-1 copolymer as used for outermost layers in Example 2 was used as a resin for outermost layers and the same resin as used for interlayer in Example 1 was used as a resin for interlayer. In the same manner as in Example 1, a multi-layer sheet having a thickness of 500μ was obtained by pressing method. From this sheet was prepared a biaxially stretched film under the same conditions as in Example 1 except that a stretching was carried out at 80° C. The stretching of the film was impossible at a temperature lower than 80° C. Properties of the thus obtained film having a thickness of about 20μ are shown in Table 1. This film was a good, flexible film being superior in transparency and tear strength and conspicuously superior in low-temperature shrinkability and free from tackiness.

Example 6

The same resin as used for outermost layers in Example 5 was used for outermost layers and a propylene-butene-1 copolymer (butene-1 content: 21.1 mol %, CXS: 26.2 wt %, MI: 3.5 g/10 min, and Vicat softening point: 90° C.) was used as a resin for interlayer. In the same manner as in Example 1, a multi-layer sheet having a thickness of 500μ was prepared by pressing method. From this multi-layer sheet was prepared a biaxially stretched film under the same conditions as in Example 1 except that the stretching was carried out at 80° C. The stretching of the sheet was impossible at a stretching temperature lower than 80° C. Properties of the thus obtained film having a thickness of about 20μ are shown in Table 1. This film was properly flexible, superior in transparency and low-temperature shrinkability and also free from tackiness and good in blocking resistance.

Example 7

The same resin as used for outermost layers in Example 2 was used for outermost layers and the same resin used for the outermost layers to which 15 parts by weight of a petroleum resin (Arkon®P-115 of Arakawa Chemical Co.) was added was used as a resin for inter-layer. In the same manner as in Example 1, a multi-layer sheet having a thickness of 500μ was prepared by pressing method. From this sheet was prepared a biaxially stretched film under the same stretching conditions as in Example 1 except that a stretching was carried out at 70° C. The sheet could not be stretched at a stretching temperature lower than 70° C. Properties of the obtained film having a thickness of about 20μ are shown in Table 1. This film was properly flexible, superior in transparency and low-temperature shrinkability and also free from tackiness and good in blocking resistance.

Example 8

The same resin as used for outermost layers in Example 5 was used for outermost layers, the same resin as used for interlayer in Example 7 was used for a first interlayer and the same resin as used for interlayer in Example 1 was used for a second interlayer. The first and second interlayers each having a thickness of 150μ were piled up on each other and sandwiched between the outermost layers each having a thickness of 100μ and the resulting assembly was pressed into a multi-layer sheet having a thickness of 500μ. From this sheet was produced a biaxially stretched film under the same conditions as in Example 1 except that the stretching was carried out at 80° C. The stretching of the sheet was impossible at a stretching temperature lower than 80° C. Properties of the thus obtained film having a thickness of about 20μ are shown in Table 1. This film was flexible, superior in transparency, low-temperature shrinkability and tear resistance, free from tackiness and also high in shrinkage rate measured at heat shrinkage.

Comparative Example 1

The same resin as used for outermost layers in Example 1 was used for outermost layers and Sumikathene®L,FA201-0 (a linear low-density polyethylene mfd. by Sumitomo Chemical Co., Ltd., MI: 1.8 g/10 min, density: 0.921 g/cm³) was used as a resin for interlayer. In the same manner as in Example 1, a multi-layer sheet having a thickness of 500μ was made by pressing method. From this sheet was prepared a biaxially stretched film under the same conditions as in Example 1 except that the stretching was carried out at 110° C. The stretching of the sheet was impossible at a stretching temperature lower than 110° C. Properties of the thus obtained film having a thickness of about 20μ are shown in Table 1. This film was inferior in low-temperature shrinkability.

Comparative Example 2

The same resin as used for outermost layers in Example 2 was used for outermost layers and the same resin as used for interlayer in Comparative Example 1 was used for interlayer. A multi-layer having a thickness of 500μ was produced by pressing method in the same manner as in Example 1. From this sheet was prepared a biaxially stretched film under the same conditions as in Example 1. The stretching of the sheet was impossible at a stretching temperature lower than 90° C. Properties of the thus obtained film having a thickness of about 20μ are shown in Table 1. This film was not so good in low-temperature shrinkability.

Comparative Example 3

The same resin as used for outermost layers in Example 1 was used alone. Using this resin, a sheet having a thickness of 500μ was prepared by pressing method. From this sheet was obtained a biaxially stretched film under the same conditions as in Example 1 except that the stretching was carried out at 120° C. The stretching of the sheet was impossible at a stretching temperature lower than 120° C. Properties of the thus obtained film having a thickness of about 20μ are shown in Table 1. This film was inferior in low-temperature shrinkability.

Comparative Example 4

The same resin as used for outermost layers in Example 2 was used alone. From this resin was prepared a sheet having a thickness of 500μ by pressing method. From this sheet was produced a biaxially stretched film under the same conditions as in Example 1. The stretching of the sheet was impossible at a stretching temperature lower than 90° C. Properties of the thus obtained film having a thickness of about 20μ are shown in Table 1. This film was not so good in low-temperature shrinkability.

Comparative Exmaple 5

The same resin as used for interlayer in Comparative Example 1 was used alone. From this resin was prepared a sheet having a thickness of 500μ by a pressing method. From this sheet was obtained a biaxially stretched film under the same conditions as in Example 1 except that the stretching was carried out at 110° C. The stretching of the sheet was impossible at a stretching temperature lower than 110° C. Properties of the thus obtained film having a thickness of about 20μ are shown in Table 1. This film was good in tear strength, but inferior in low-temperature shrinkability.

Comparative Example 6

The same resin as used for interlayer in Example 1 was used alone. Therefrom was produced a sheet having a thickness of 500μ by pressing method. This sheet was subjected to the biaxial stretching under the same conditions as in Example 1 except that the stretching temperature were variously changed. No satisfactory films were obtained at any stretching temperatures.

Comparative Example 7

The same resin as used for interlayer in Example 7 was used alone. Therefrom was produced a sheet having a thickness of 500μ by pressing method. A biaxially stretched film was obtained therefrom under the same conditions as in Example 1 except that the stretching was carried out at 70° C. This film was very tacky and thus inferior in blocking resistance.

The multi-layer shrink film of the present invention is good in low-temperature shrinkability and also superior in transparency and blocking resistance. Further, wrinkles hardly occur in corner parts at the time of shrink packaging resulting in film finish. Moreover, since the film is soft, there is no problems of warping of the packaged articles. Also, no corrosive gases are generated at melt cutting and heat sealing and the film can be produced at low cost. Thus, the practical values of the present invention is markedly high.

TABLE 1

| Example or Comparative Example | | Example 1 | Example 2 | Example 3 |
|---|---|---|---|---|
| Outermost layer | Propylene resin | FS6632[1] | Propylene-butene-1 copolymer | ← |
| | Vicat softening point (°C.) | 125 | 99 | ← |
| Interlayer | Resin for interlayer | CN2002[3] | ← | $\frac{CN2002}{FA201-0} = \frac{75}{25}$ |
| | Vicat softening point (°C.) | | | |
| Properties of film | Haze (%) | 1.8 | 1.5 | 1.6 |
| | Young's modulus (Kg/cm³) | 4,800 | 3,700 | 3,900 |
| | Tear strength (Kg/cm) | 10.5 | 11.2 | 9.7 |
| | Shrinkage at 80° C. (%) | 13.8 | 31.3 | 30.7 |

| Example or Comparative Example | Example 4 | Example 5 | Example 6 | Example 7 |
|---|---|---|---|---|

TABLE 1-continued

| | | | | | | |
|---|---|---|---|---|---|---|
| Outer-most layer | Propylene resin | ← | $\frac{WF816^2}{\text{Propylene-butene} - 1 \text{ copolymer}} = \frac{7}{3}$ | ← | | Propylene-butene-1 copolymer |
| | Vicat softening point (°C.) | ← | 112 | 112 | | 99 |
| Inter-layer | Resin for interlayer | A-4085[4] | CN2002 | | Propylene-butene-1 copolymer copolymer | Propylene-butene-1 copolymer & petroleum resin |
| | Vicat softening point (°C.) | | | | 90 | 84 |
| Pro-per-ties of film | Haze (%) | 1.5 | 1.9 | | 1.8 | 1.7 |
| | Young's modulus (Kg/cm³) | 3,500 | 4,300 | | 7,800 | 8,100 |
| | Tear strength (Kg/cm) | 11.7 | 10.7 | | 4.0 | 4.1 |
| | Shrinkage at 80° C. (%) | 32.1 | 22.1 | | 24.2 | 33.5 |

| Example or Comparative Example | | Example 8 | Comparative Example 1 | Comparative Example 2 | Comparative Example 3 |
|---|---|---|---|---|---|
| Outer-most layer | Propylene resin | Same as in Example 5 | FS6632 | Propylene-butene-1 copolymer | FS6632 |
| | Vicat softening point (°C.) | 112 | 125 | 99 | 125 |
| Inter-layer | Resin for interlayer | CN2002 | Propylene-butene-1 copolymer & petroleum resin | FA201-0[5] | ← |
| | Vicat softening point (°C.) | 84 | | | |
| Pro-per-ties of film | Haze (%) | 1.9 | 2.1 | 2.0 | 2.3 |
| | Young's modulus (Kg/cm³) | 6,100 | 5,500 | 4,500 | 13,300 |
| | Tear strength (Kg/cm) | 9.2 | 5.7 | 5.9 | 3.5 |
| | Shrinkage at 80° C. (%) | 23.3 | 6.3 | 10.8 | 3.8 |

| Example or Comparative Example | | Comparative Example 4 | Comparative Example 5 | Comparative Example 6 | Comparative Example 7 |
|---|---|---|---|---|---|
| Outer-most layer | Propylene resin | Propylene-butene-1 copolymer | | | |
| | Vicat softening point (°C.) | 99 | | | |
| Inter-layer | Resin for interlayer | | FA201-0 | CN2002 | Propylene-butene-1 copolymer & petroleum resin |
| | Vicat softening point (°C.) | | | | 84 |
| Pro-per-ties of film | Haze (%) | 1.6 | 2.4 | | |
| | Young's modulus (Kg/cm³) | 9,500 | 2,600 | | |
| | Tear strength (Kg/cm) | 3.6 | 9.8 | | |
| | Shrinkage | 10.9 | 6.1 | | |

TABLE 1-continued at 80° C. (%)

[1] Sumitomo Noblen ®FS6632 mfd. by Sumitomo Chemical Co., Ltd.
[2] Sumitomo Noblen ®WF816 mfd. by Sumitomo Chemical Co., Ltd.
[3] Excellen ®-VL CN2002 mfd. by Sumitomo Chemical Co., Ltd.
[4] Tafmer ®A-4085 mfd. by Mitsui Petro-chemical Industries, Ltd.
[5] Sumikathene ®-L FA201-0 mfd. by Sumitomo Chemical Co., Ltd.

What is claimed is:

1. A multi-layer shrink film obtained by forming an assembly which comprises an interlayer comprising a flexible propylene resin having a Vicat softening point of 115° C. or less and/or a linear very los-density polyethylene having a density less than 0.91 g/cm³ sandwiched between outermost layers comprising a propylene resin having a Vicat softening point higher than that of the flexible propylene resin of the interlayer, in the case the interlayer comprises propylene resin, and within the range of 85°–140° C. followed by stretching said assembly.

2. A multi-layer shrink film according to claim 1, wherein the flexible propylene resin of interlayer comprises a blend of a flexible propylene resin and a hydrocarbon resin.

3. A multi-layer shrink film which comprises a stretched multi-layer sheet comprising a plurality of piled-up interlayers at least one of which comprises a flexible propylene resin having a Vicat softening point of 115° C. or less and at least one of which comprises a linear very low-density polyethylene having a density less than 0.91 g/cm³ sandwiched between outermost layers comprising a propylene resin having a Vicat softening point higher than that of the flexible propylene resin of interlayer and within the range of 85°–140° C.

* * * * *